(12) United States Patent
Zhang et al.

(10) Patent No.: US 10,896,305 B1
(45) Date of Patent: Jan. 19, 2021

(54) ELECTRONIC PAYMENT DEVICE

(71) Applicant: Advanced New Technologies Co., Ltd., Grand Cayman (KY)

(72) Inventors: Mingwei Zhang, Hangzhou (CN); Fenghuan Gu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/813,619

(22) Filed: Mar. 9, 2020

Related U.S. Application Data

(63) Continuation of application No. PCT/CN2020/071673, filed on Jan. 13, 2020.

(30) Foreign Application Priority Data

Jul. 15, 2019 (CN) .......................... 2019 2 1108575

(51) Int. Cl.
*G06K 7/14* (2006.01)

(52) U.S. Cl.
CPC .................................. *G06K 7/1404* (2013.01)

(58) Field of Classification Search
CPC .................................................... G06K 7/1404
USPC ........................................ 235/454, 380, 383
See application file for complete search history.

(56) References Cited

U.S. PATENT DOCUMENTS

| D857,791 | S | 8/2019 | Luo et al. |
| 2006/0255134 | A1* | 11/2006 | Schmidt ............... G06Q 20/202 235/383 |
| 2013/0262248 | A1 | 10/2013 | Kim et al. |
| 2014/0239065 | A1* | 8/2014 | Zhou ....................... G06F 1/163 235/380 |
| 2015/0022505 | A1* | 1/2015 | Lee ......................... G06F 3/017 345/179 |
| 2017/0076269 | A1* | 3/2017 | Saeed .................. G07G 1/0018 |
| 2018/0095588 | A1* | 4/2018 | Klein ....................... G09B 5/00 |
| 2019/0066076 | A1 | 2/2019 | Lee et al. |
| 2020/0210989 | A1 | 7/2020 | Zhang et al. |

FOREIGN PATENT DOCUMENTS

| CN | 204028987 U | 12/2014 |
| CN | 205508014 U | 8/2016 |
| CN | 205751077 U | 11/2016 |
| CN | 206470887 U | 9/2017 |
| CN | 207302244 U | 5/2018 |
| CN | 207367263 U | 5/2018 |
| CN | 207558116 U | 6/2018 |
| CN | 208722353 U | 4/2019 |
| CN | 109993931 | 7/2019 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Allyson N Trail
(74) *Attorney, Agent, or Firm* — Fish & Richardson P.C.

(57) ABSTRACT

The present specification provides an electronic payment device, including a console comprising a housing, a scanning window disposed on the housing, and a camera. The electronic payment device also comprises a material plate detachably attached to the console.

18 Claims, 3 Drawing Sheets

(56) References Cited

FOREIGN PATENT DOCUMENTS

JP       2011039738       2/2011
WO    WO 2018153021    8/2018

OTHER PUBLICATIONS

Nakamoto, "Bitcoin: A Peer-to-Peer Electronic Cash System," www.bitcoin.org, 2005, 9 pages.
International Search Report and Written Opinion in PCT Appln. No. PCT/CN2020/071359, dated Apr. 13, 2020, 8 pages (full machine translation).
International Search Report and Written Opinion in PCT Appln. No. PCT/CN2020/071673, dated Apr. 17, 2020, 9 pages (full machine translation).
U.S. Appl. No. 16/812,159, filed Mar. 6, 2020, Zhang et al.
U.S. Appl. No. 16/812,159, Zhang et al, Mar. 6, 2020.

* cited by examiner

ELECTRONIC PAYMENT DEVICE

CROSS-REFERENCE TO RELATED APPLICATIONS

This application is a continuation of PCT Application No. PCT/CN2020/071673, filed on Jan. 13, 2020, which claims priority to Chinese Patent Application No. 201921108575.X, filed on Jul. 15, 2019, and each application is hereby incorporated by reference in its entirety.

TECHNICAL FIELD

The present specification relates to an electronic payment device.

BACKGROUND

On the current market, due to development of mobile phone payment, there are more payment boxes for scanning payment. However, the related payment boxes have only scanning windows and do not have material information, and manpower is needed for guidance, which affects customer experience.

SUMMARY

The present specification provides an electronic payment device with material information on detachable material.

An implementation of the present specification provides an electronic payment device, including a console and a material plate detachably assembled to the console, where the console includes a housing, a scanning window disposed on the housing, and a camera.

Further, the material plate includes a base part and a protrusion that extends from the base part, the protrusion is made of transparent material, and the protrusion covers the scanning window.

Further, the protrusion is fastened to the housing through sealing, or the protrusion is fastened to the housing through buckling.

Further, the material plate includes a base part and an opening disposed in the base part, and the housing is fastened to the base part through sealing, or the housing is fastened to the base part through buckling.

Further, the material plate is fastened to the housing through suction cups or adhesion.

Further, the housing includes an extension part located on a side of the scanning window, and the material plate is detachably assembled to the extension part.

Further, the material plate is fastened to the extension part through sealing, buckling, suction cups, or adhesion.

Further, the housing includes a first sidewall, an extension part that extends from the first sidewall, and a second sidewall that extends obliquely from the first sidewall, the scanning window is disposed on the first sidewall, and the material plate is detachably assembled to the extension part.

Further, the extension part includes a recess configured to accommodate the material plate.

Further, the material plate is coplanar with the first sidewall.

Further, one of the extension part and the material plate includes an opening, and the other includes a protrusion to be accommodated in the opening.

Further, the material plate and the housing are fastened together through buckling, sealing, sliding, suction cups, or adhesion Further, the electronic payment device is a code scanning payment device or a face recognition payment device, the electronic payment device includes a processing module, and the camera is configured to identify a two-dimensional code or a face of a user and transfer information to the processing module.

It can be determined from the previous technical solutions that, the electronic payment device in the implementations of the present specification includes the material plate detachably assembled to the console, to conveniently place material information and replace material information.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent the same element or similar elements. Implementations described in the following example implementations do not represent all implementations consistent with the present specification. On the contrary, they are only examples of apparatuses that are described in the appended claims in detail and that are consistent with some aspects of the present specification.

The terms used in the present specification are merely used for the purpose of describing specific implementations, and are not intended to limit the present specification. The singular forms "a", "the", and "this" used in the present specification and the appended claims are also intended to include plural forms, unless otherwise specified in the context clearly. It is worthwhile to further understand that, the term "and/or" used in the present specification indicates and includes any or all possible combinations of one or more associated listed items.

It is worthwhile to understand that although terms such as "first", "second", and "third" may be used in the present specification to describe various types of information, these types of information are not limited by these terms. These terms are only used to distinguish between information of the same type. For example, without departing from the scope of the present specification, "first information" can also be referred to as "second information", and similarly "second information" can also be referred to as "first information". Depending on the context, for example, the word "if" used here can be explained as "while", "when", or "in response to determining".

The following describes an electronic payment device in the present specification in detail with reference to the accompanying drawings. Without a conflict, the following implementations and the features in the implementations can be mutually combined.

Figure 1:
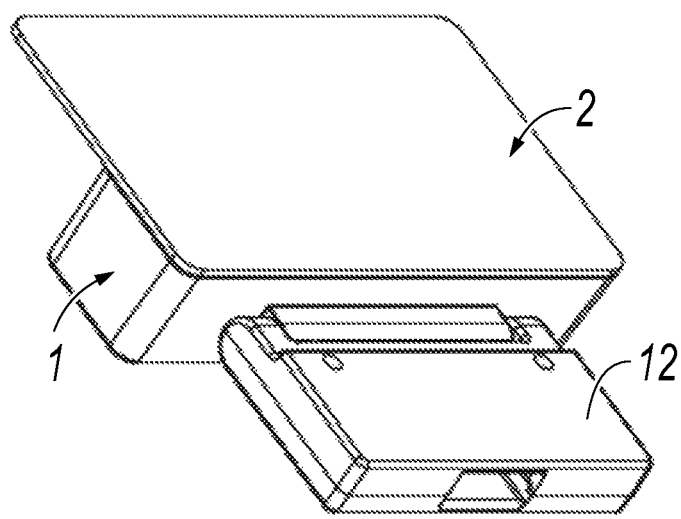
FIG. 1 is a 3D view illustrating an electronic payment device, according to an example implementation of the present specification.
Figure 2:
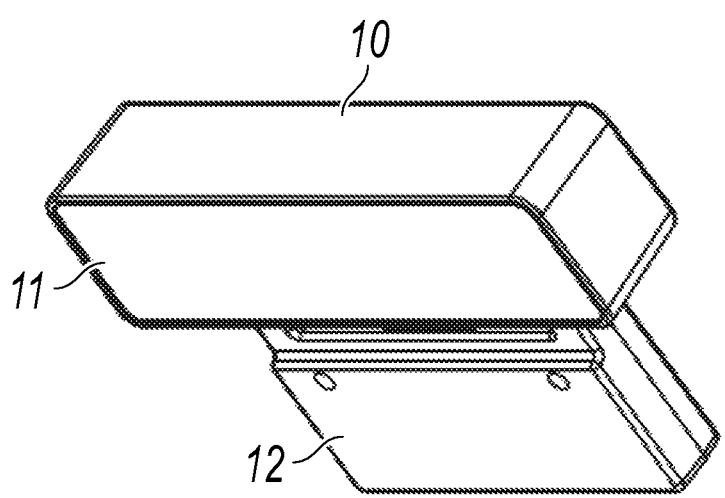
FIG. 2 is a 3D view illustrating a console of the electronic payment device shown in FIG. 1.
Figure 3:
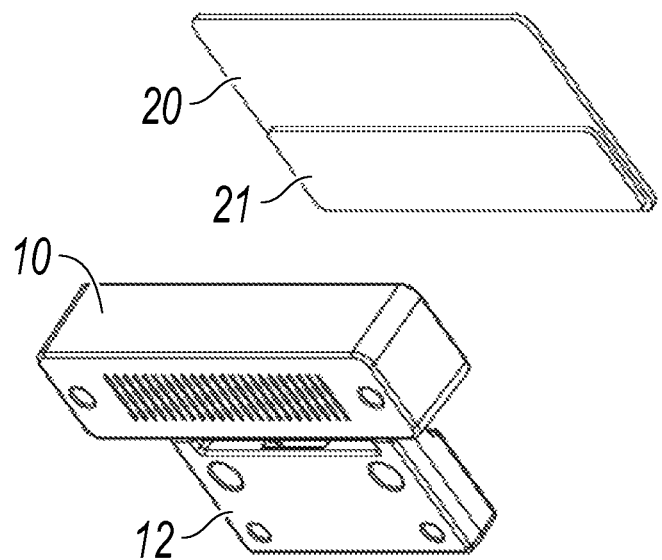
FIG. 3 is a 3D view existing before a console of the electronic payment device shown in FIG. 1 is assembled with a material plate.

Mainly referring to FIG. 1 to FIG. 3, an electronic payment device in an example implementation of the present specification includes a console 1 and a material plate 2 detachably assembled to the console 1. Two-dimensional code information or other guidance terms of a merchant, such as code scanning payment, face scanning payment, or other advertisement information, can be placed on the material plate 2. The material plate 2 is detachable, to conveniently replace material information, thereby improving universality of the electronic payment device.

The console 1 includes a housing 10, a scanning window 11 located on the housing 10, a camera (not shown) and a light source (not shown) that are disposed relative to the scanning window 11, a processing module (not shown) assembled to the housing 10, and an assembling part 12 connected to the housing 10. The assembling part 12 is detachably assembled to an electronic product, to implement a scanning payment function. The assembling part 12 is rotatably assembled to the electronic product and/or the housing 10 is rotatably connected to the assembling part 12, to conveniently adjust a direction of the scanning window 11 to identify payment information, such as a two-dimensional code or a face of a user more easily.

In the illustrated implementation, the electronic payment device is a face scanning device. When using the face scanning device, a face of a user is aligned with the scanning window 11 of the face scanning device, the camera obtains facial information of the user and sends the facial information of the user to the processing module, and the processing module is configured to send the facial information of the user to a back end server, so that payment can be performed. The present specification is not limited thereto. Alternatively, the electronic payment device can be a code scanning payment device. When using the code scanning payment device, a payment code of a user is aligned with the scanning window 11 of the code scanning payment device, the camera obtains information about the payment code and sends the information about the payment code to the processing module, and the processing module is configured to send the information about the payment code to a back end server, so that payment can be performed. Alternatively, the electronic payment device in the present specification can perform payment by identifying, for example, a fingerprint. The light source is configured to illuminate the scanning window 11, to enhance photographing effect of the camera.

The material plate 2 includes a base part 20 and a protrusion 21 that extends from the base part 20. The protrusion 21 tightly fits with the housing 10, to fasten the material plate 2 to the console 1; or the protrusion 21 and the housing 10 are fastened together through buckling, to fasten the material plate 2 to the console 1. Alternatively, the base part 20 includes an opening configured to accommodate the housing 10, and the housing 10 and the base part 20 are fastened together through sealing or buckling, to fasten the material plate 2 to the console 1. Alternatively, the material plate 2 can be fastened to the console 1 through suction cups or adhesion. The suction cups means that the material plate 2 can be fastened to the console 1 through magnetic suction cups, vacuum suction cups, etc. The adhesion means that the material plate 2 can be fastened to the console 1 through velcro adhesion, gluing, etc.

An area of the base part 20 is greater than an area of the scanning window 11, to place material information. The protrusion 21 covers the scanning window 11, and the protrusion 21 is made of transparent material to prevent the protrusion 21 from blocking the camera.

In the illustrated implementation, the material plate 2 is assembled to the housing 10. The present specification is not limited thereto. The housing 10 can include an extension part (not shown) located on a side of the scanning window, and the material plate 2 is detachably assembled to the extension part. One of the material plate 2 and the extension part can include an opening, and the other includes a protrusion to be assembled to the opening, to assemble the material plate 2 to the extension part. Alternatively, one of the extension part and the material plate includes a side (not shown), and the other tightly fits with the side to fasten the material plate 2 to the extension part; or the side includes a sliding groove, and the material plate 2 is slid into the extension part from a side of the console 1. Alternatively, the extension part and the material plate 2 are fastened together through buckling, to fasten the material plate 2 to the extension part. Alternatively, the material plate 2 can be fastened to the extension part through suction cups or adhesion. The suction cups means that the material plate 2 can be fastened to the extension part through magnetic suction cups, vacuum suction cups, etc. The adhesion means that the material plate 2 can be fastened to the extension part through velcro adhesion, gluing, etc.

Figure 4:
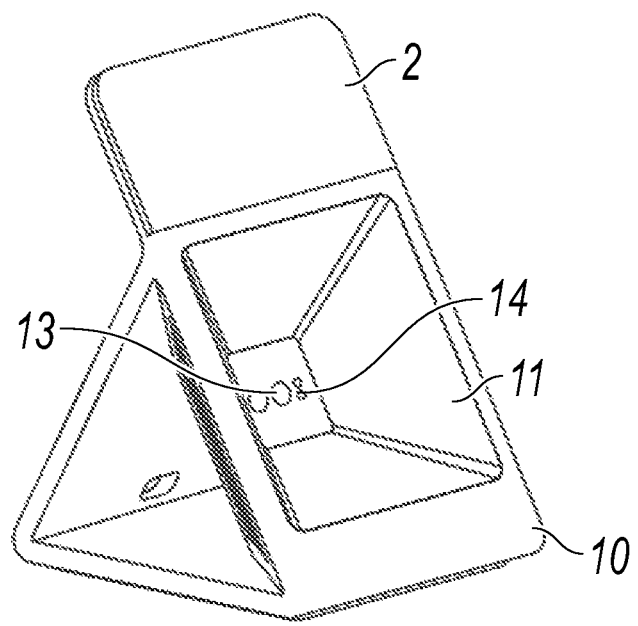
FIG. 4 is a 3D view illustrating another implementation of an electronic payment device, according to an example implementation of the present specification.
Figure 5:
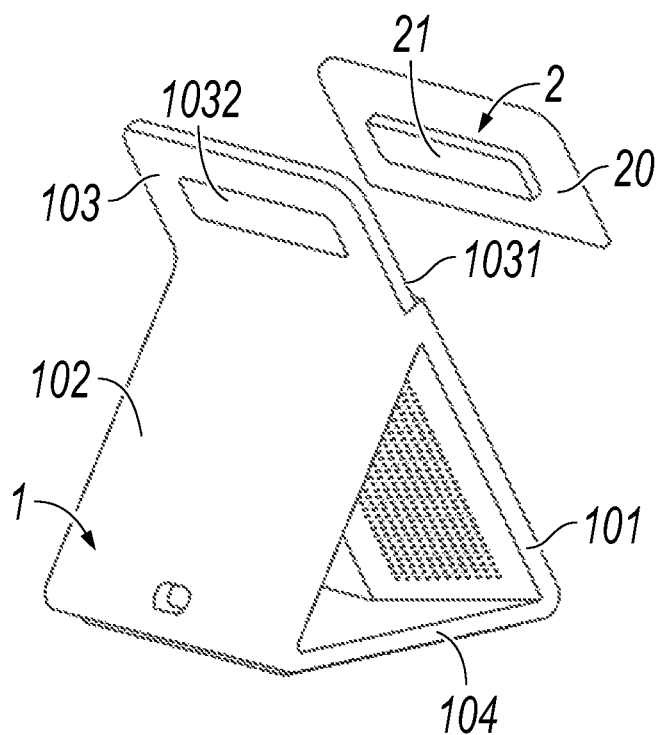
FIG. 5 is a 3D view existing before a console of the electronic payment device shown in FIG. 4 is assembled with a material plate.

Referring to FIG. 4 and FIG. 5, in another implementation, the housing 10 includes a first sidewall 101, a second sidewall 102 that extends obliquely from the first sidewall 101, an extension part 103 that extends from the first sidewall 101, and a bottom surface 104 that connects the first sidewall 101 and the second sidewall 102. The scanning window 11 is disposed on the first sidewall 101. The camera 13 and the light source 14 are disposed relative to the scanning window 11.

The material plate 2 is detachably assembled to the extension part 103. The material plate 2 includes a base part 20 and a protrusion 21 that extends from the base part 20. The extension part 103 includes a recess 1031 configured to accommodate the base part 20 and an opening 1032 configured to fit with the protrusion 21, to fasten the material plate 2 to the extension part 103. After the material plate 2 is assembled to the extension part 103, the material plate 2 is coplanar with the first sidewall 101, to enhance beauty of the electronic payment device and facilitate dust cleaning.

In the illustrated implementation, the opening 1032 is located in the extension part 103, and the protrusion 21 is disposed on the material plate 2. The present specification is not limited thereto. The opening 1032 can be disposed in the material plate 2, and the protrusion 21 can be disposed on the extension part 103. Alternatively, one of the extension part 103 and the material plate 2 includes a side (not shown), and the other tightly fits with the side to fasten the material plate 2 to the extension part 103; or the side includes a sliding groove, and the material plate 2 is slid into the extension part 103 from a side of the console 1. Alternatively, one of the extension part 103 and the material plate 2 includes a buckle, and the material plate 2 is fastened to the extension part 103 through buckling. Alternatively, the material plate 2 can be fastened to the extension part 103 through suction cups or adhesion. The suction cups means that the material plate 2 can be fastened to the extension part 103 through magnetic suction cups, vacuum suction cups, etc. The adhesion means that the material plate 2 can be fastened to the extension part 103 through velcro adhesion, gluing, etc.

The electronic payment device in this implementation of the present specification includes the material plate 2 detachably assembled to the console 1, to conveniently place material information and replace material information. The console 1 is rotatably assembled to an electronic product, to conveniently adjust a direction of the scanning window 11 to identify payment information, such as a two-dimensional code or a face of a user more easily.

A person skilled in the art can easily figure out other implementation solutions of the present specification after considering the present specification and practicing the present specification disclosed here. The present specification is intended to cover any variations, functions, or adaptive changes of the present specification. These variations, functions, or adaptive changes comply with general principles of the present specification, and include common knowledge or a commonly used technical means in the technical field that is not disclosed in the present specification. The present specification and the implementations are merely considered as examples, and the actual scope and spirit of the present specification are pointed out by the following claims.

It is worthwhile to further note that the term "include", "comprise", or their any other variant is intended to cover a non-exclusive inclusion, so that a process, method, product, or device that includes a series of elements not only includes those elements but also includes other elements that are not expressly listed, or further includes elements inherent to such process, method, product, or device. An element preceded by "includes a . . . " does not, without more constraints, preclude the presence of additional identical elements in the process, method, product, or device that includes the element.

The previous descriptions are merely example implementations of the present specification, but are not intended to limit the present specification. Any modification, equivalent replacement, improvement, etc. made without departing from the spirit and principle of the present specification shall fall within the protection scope of the present specification.

What is claimed is:

1. An electronic payment device, comprising:
    a console comprising:
        a housing;
        a scanning window disposed on the housing; and
        a camera; and
    a material plate detachably attached to the console, wherein the material plate comprises:
        a base; and
        a protrusion that extends from the base, wherein the protrusion is transparent and covers the scanning window.

2. The electronic payment device according to claim 1, wherein the protrusion is sealed or snapped on to the housing.

3. The electronic payment device according to claim 1, wherein the base includes an opening.

4. The electronic payment device according to claim 3, wherein the housing is sealed or snapped on to the material plate through the opening.

5. The electronic payment device according to claim 1, wherein the material plate is attached to the housing by one or more suction cups or by adhesion.

6. The electronic payment device according to claim 1, wherein the housing comprises:
    an extension that extends from a sidewall of the housing that hosts the scanning window.

7. The electronic payment device according to claim 6, wherein the material plate is detachably attached to the extension.

8. The electronic payment device according to claim 7, wherein the material plate is detachably attached to the extension by one or more of sealing, snapping, one or more suction cups, or sliding-in.

9. The electronic payment device according to claim 1, wherein the housing comprises:
    a first sidewall that hosts the scanning window; and
    a second sidewall that extends obliquely from the first sidewall.

10. The electronic payment device according to claim 9, wherein the housing further comprises:
    an extension of the first sidewall that extends beyond an intersection of the first sidewall and the second sidewall.

11. The electronic payment device according to claim 10, wherein the material plate is detachably attached to the extension.

12. The electronic payment device according to claim 10, wherein the extension comprises a recess that accommodates at least a portion of the material plate.

13. The electronic payment device according to claim 10, wherein the material plate comprises an opening, and the extension comprises a protrusion that fits into the opening.

14. The electronic payment device according to claim 9, wherein the material plate is coplanar with the first sidewall.

15. The electronic payment device according to claim 9, wherein the material plate is attached to the housing through one of sealing, snapping, one or more suction cups, or sliding-in.

16. The electronic payment device according to claim 1, wherein the electronic payment device is a code scanning payment device.

17. The electronic payment device according to claim 1, wherein the electronic payment device is a face recognition payment device.

18. The electronic payment device according to claim 1, wherein the electronic payment device further comprises:
    at least one processor; and
    a memory that stores programming instructions, the programming instructions, when executed by the at least one processor, cause the camera to capture information associated with a two-dimensional code or a face of a user and to transfer the information to the at least one processor.

* * * * *